(12) United States Patent
Hohmann et al.

(10) Patent No.: US 6,966,497 B1
(45) Date of Patent: Nov. 22, 2005

(54) DATA CARRIER WITH A BATTERY AND DISPLAY

(75) Inventors: Arno Hohmann, Munich (DE); Hans Graf, Rosenheim (DE)

(73) Assignee: Giesecke & Devrient GmbH, Munich (DE)

(*) Notice: Subject to any disclaimer, the term of this patent is extended or adjusted under 35 U.S.C. 154(b) by 0 days.

(21) Appl. No.: 09/926,191

(22) PCT Filed: Mar. 22, 2000

(86) PCT No.: PCT/EP00/02544
§ 371 (c)(1),
(2), (4) Date: Jan. 28, 2002

(87) PCT Pub. No.: WO00/57355
PCT Pub. Date: Sep. 28, 2000

(30) Foreign Application Priority Data
Mar. 23, 1999 (DE) ................. 199 13 093

(51) Int. Cl.[7] ........................................... G06K 19/06
(52) U.S. Cl. ............... 235/492; 235/379; 235/380; 235/487; 235/451
(58) Field of Search ............... 235/492, 379, 235/380, 487, 441, 451

(56) References Cited

U.S. PATENT DOCUMENTS

| | | | | |
|---|---|---|---|---|
| 4,575,621 A | * | 3/1986 | Dreifus | ................... 235/380 |
| 4,794,236 A | * | 12/1988 | Kawana et al. | ............. 235/441 |
| 4,812,634 A | * | 3/1989 | Ohta et al. | ................... 235/492 |
| 4,814,591 A | * | 3/1989 | Nara et al. | ................... 235/380 |
| 4,864,109 A | * | 9/1989 | Minematsu et al. | ........ 235/379 |
| 5,146,068 A | * | 9/1992 | Ugawa et al. | .............. 235/441 |
| 5,225,667 A | * | 7/1993 | Furuta et al. | ............... 235/492 |
| 5,376,778 A | | 12/1994 | Kreft | |
| 5,426,667 A | | 6/1995 | van Zon | |
| 5,594,465 A | | 1/1997 | Poulachon | |
| 5,789,733 A | | 8/1998 | Jachimowicz et al. | |
| 5,955,961 A | * | 9/1999 | Wallerstein | ................. 340/5.4 |

FOREIGN PATENT DOCUMENTS

| | | | |
|---|---|---|---|
| DE | 39 06 349 | 9/1990 | |
| DE | 196 30 611 | 11/1997 | |
| DE | 196 31 557 | 2/1998 | |
| DE | 298 03 987 | 6/1998 | |
| EP | 0 562 292 B1 | 9/1993 | |
| FR | 2 694 439 | 2/1994 | |
| FR | 2 725 084 | 3/1996 | |
| FR | 2725084 A1 | * 3/1996 | |
| JP | 10162111 A | * 6/1998 | ........ G06K 19/07 |

* cited by examiner

*Primary Examiner*—Steven S. Paik
(74) *Attorney, Agent, or Firm*—Bacon & Thomas, PLLC

(57) ABSTRACT

A data carrier used for an electronic purse including a display arranged to indicate a credit balance present in the electronic purse, and a battery in combination with a device for detecting the usability or probability of use of the display. The device is configured to determine the opereability and brightness of the display. The device is arranged to selectively deactivate the display upon an indication of a predetermined criteria.

1 Claim, 1 Drawing Sheet

DATA CARRIER WITH A BATTERY AND DISPLAY

BACKGROUND OF THE INVENTION

This invention relates to a data carrier, in particular a smart card, with a battery and a display.

For payment transactions there has been introduced in recent years a money card, a so-called electronic purse, which is formed by a smart card. At suitably designed terminals one can load amounts of money into the electronic memory of the smart card to be used later for the payment of purchases.

Known smart cards have the disadvantage, however, that the user cannot see which amount of money is still available. The article "Dünn wie Papier," Wirtschaftswoche, 21 Jan. 1999, discloses a smart card that permits a user to find out the particular amount of money available. The smart card has for this purpose a display that is supplied by a flat battery and can be activated by means of a switch.

Because of the small volume of the smart card, it must be guaranteed for a long life that the display is only supplied with power when this is intended by the user of the smart card. This cannot be reliably guaranteed in the known smart card since smart cards are usually kept in wallets or billfolds. The probability of inadvertent operation of the switch is therefore very high since in the wallet or billfold the smart card is constantly subjected to pressure from both sides which can also act on the switch. This would lead to relatively rapid discharge of the battery, thereby reducing the life of the smart card altogether.

It is therefore the problem of the present invention to state a data carrier, in particular a smart card, in which no inadvertent discharge of the battery can occur.

SUMMARY OF THE INVENTION

This problem is solved by the features of claim 1.

The invention starts out from the idea of providing a device which detects whether the display can be used by a user or whether use is likely at the particular time. If no use is possible the power supply to the display from the battery is interrupted.

The advantage of the inventive data carrier is in particular that inadvertent discharge of the battery by the display is reliably avoided.

In a first advantageous embodiment, the data carrier has a photosensitive sensor that drives a switch. If a predetermined luminosity is fallen below, the sensor drives the switch and interrupts the power supply from the battery to the display.

In a second advantageous embodiment, the data carrier has a solar cell. The solar cell changes its resistance in inverse proportion to brightness. At low brightness the current flow between battery and display is thus interrupted.

BRIEF DESCRIPTION OF THE DRAWINGS

The advantage of the first and second embodiments is to be seen in that the above-described problem of inadvertent operation of the display in particular in a billfold or wallet can be reliably avoided since virtually complete darkness prevails in such receptacles. Current flow between battery and display is therefore reliably prevented even if the switch provided for the display is operated involuntarily. Additionally, operation of the display is always prevented when insufficient brightness is present for the display to be read.

In a third advantageous embodiment it is provided that a switch is driven by means of a timing device. If the timing device detects that the display is activated for a relatively long, presettable time period, it switches off the display by means of the switch. This avoids unintentional operation of the display and thus an emptying of the battery.

Figure 1:
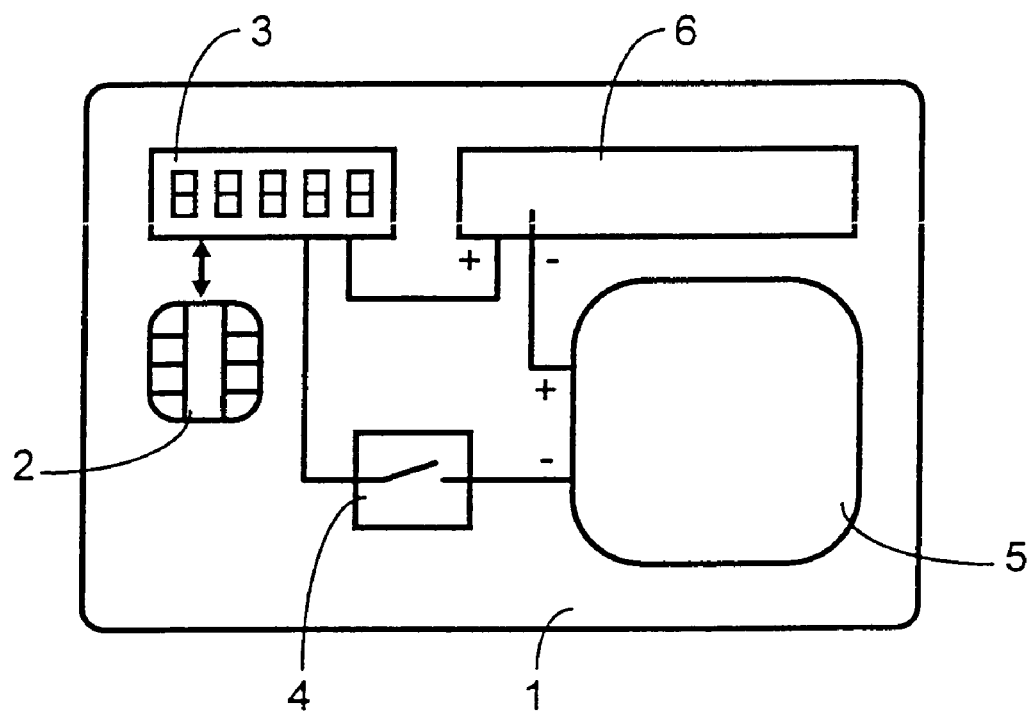

Further advantages of the present invention will result from the following description with reference to a FIGURE.

FIG. 1 shows the schematic structure of an inventive data carrier.

FIG. 1 shows a data carrier comprising carrier 1 with electronic circuit 2, display 3, battery 5 that is connected with display 3 via switch 4, and device 6 for detecting the usability or probability of use of display 3.

DETAILED DESCRIPTION OF THE INVENTION

Display 3 is used for representing data contained in electronic circuit 2. Display 3 can be activated via switch 4 and then indicates the data content of circuit 2. Such a data content may be for example, the credit balance of an electronic purse. Unlike the schematic structure of the data carrier shown in FIG. 1, a different structure can be chosen. For example, electronic circuit 2 may not be a contact-type one as shown, but a contactless one. Electronic circuit 2 then has suitable coupling elements, e.g. antennas. Electronic circuit 2 may furthermore also be supplied with power by battery 5. Deviating from the schematic structure shown in FIG. 1, the individual elements of the data carrier may also overlap. For example, battery 5 may be formed so as to extend under the display and/or under device 6.

When switch 4 is operated to activate display 3, display 3 is supplied with power by battery 5 via switch 4 and device 6 for detecting the usability or probability of use. Device 6 for detecting the usability or probability of use of display 3 continuously checks in the activated state whether the display can be read by a user at all or whether there is a certain probability of the display being used or read by a user. If device 6 detects that no usability is given or that the probability of use of the display by a user is low, it interrupts the electric connection between battery 5 and display 3. This can be done by interrupting one supply line, as shown in FIG. 1, but it is also possible to interrupt both supply lines. Deviating from the interruption of one or both supply lines, it is also possible to increase the resistance within the circuit comprising display and battery in such a way that no or at least very little current can flow.

In a first embodiment, device 6 for detecting the usability of display 3 can have a photosensitive sensor and a switch, the switch acting on the connection between battery 5 and display 3. If the photosensitive sensor in device 6 detects that only very low brightness exists, the switch in device 6 is operated to interrupt the connection between battery 5 and display 3. Advantageously, the switch within device 6 is formed by a semiconductor switch, for example a transistor.

In a second embodiment, device 6 for detecting the usability of display 3 is formed by a solar cell. The solar cell is connected in series with battery 5. In the dark state or at low brightness, only low current can flow through the solar cell, resulting altogether in a high electric resistance that counteracts a fast discharge of the battery when the display cannot be used and was operated inadvertently, for example when it is kept in a billfold.

If device 6 for detecting the usability of display 3 is formed by a solar cell, display 3 can be used as an additional interrupter. This can be obtained by selecting the voltage of battery 5 to be lower than the threshold voltage of display 3. For example, lithium flat cells suitable for smart cards deliver an average discharge voltage of approximately 2.85 V. However, in order to be able to operate common displays, e.g. LED displays, a threshold voltage of 3 to 3.5 V is necessary. If the solar cell is connected in series with battery 5, as described above, the required threshold voltage of 3 to 3.5 V can be easily reached if the solar cell delivers a voltage of 0.5 V for example. In case of insufficient brightness, the voltage altogether available falls under the threshold voltage, thereby interrupting the current flow from the battery through the solar cell and the display itself. Connecting the solar cell in series with a battery to reach the threshold voltage necessary for the display has the additional advantage that the operation of display 3*a* does not require the usual potential transformer. This additionally prolongs the life of the battery since such potential transformers usually have an efficiency of only approximately 80%.

In a third embodiment, device 6 for detecting the probability of use of display 3 by a user has means for timing. When switch 4 is operated and display 3 activated, the current flow through device 6 puts the time detection means into operation. If a predetermined time is exceeded, the time detection means operates a switch present in device 6 to interrupt the current flow between display 3 and battery 5. When switch 4 is opened, the switch present in device 6 is closed to permit reactivation of display 3 via switch 4. As means for timing in device 6 one can use a counter for example. In this embodiment it is assumed that the probability of use of display 3 by a user is low if a predetermined time, e.g. one minute, has expired since the display shows only low information content, for example a remaining credit balance of an electronic purse.

What is claimed is:

1. A data carrier comprising a carrier with at least an electronic circuit, a battery and a display, the data carrier having a solar cell for detecting the usability or probability of use of the display, wherein the solar cell and the battery are electrically connected in series, the voltage of the battery being lower than the threshold voltage of the display.

* * * * *